H. SCHULTE-STEINBERG.
PROCESS OF MOLDING BRICKS.
APPLICATION FILED APR. 6, 1909.
971,693.
Patented Oct. 4, 1910.
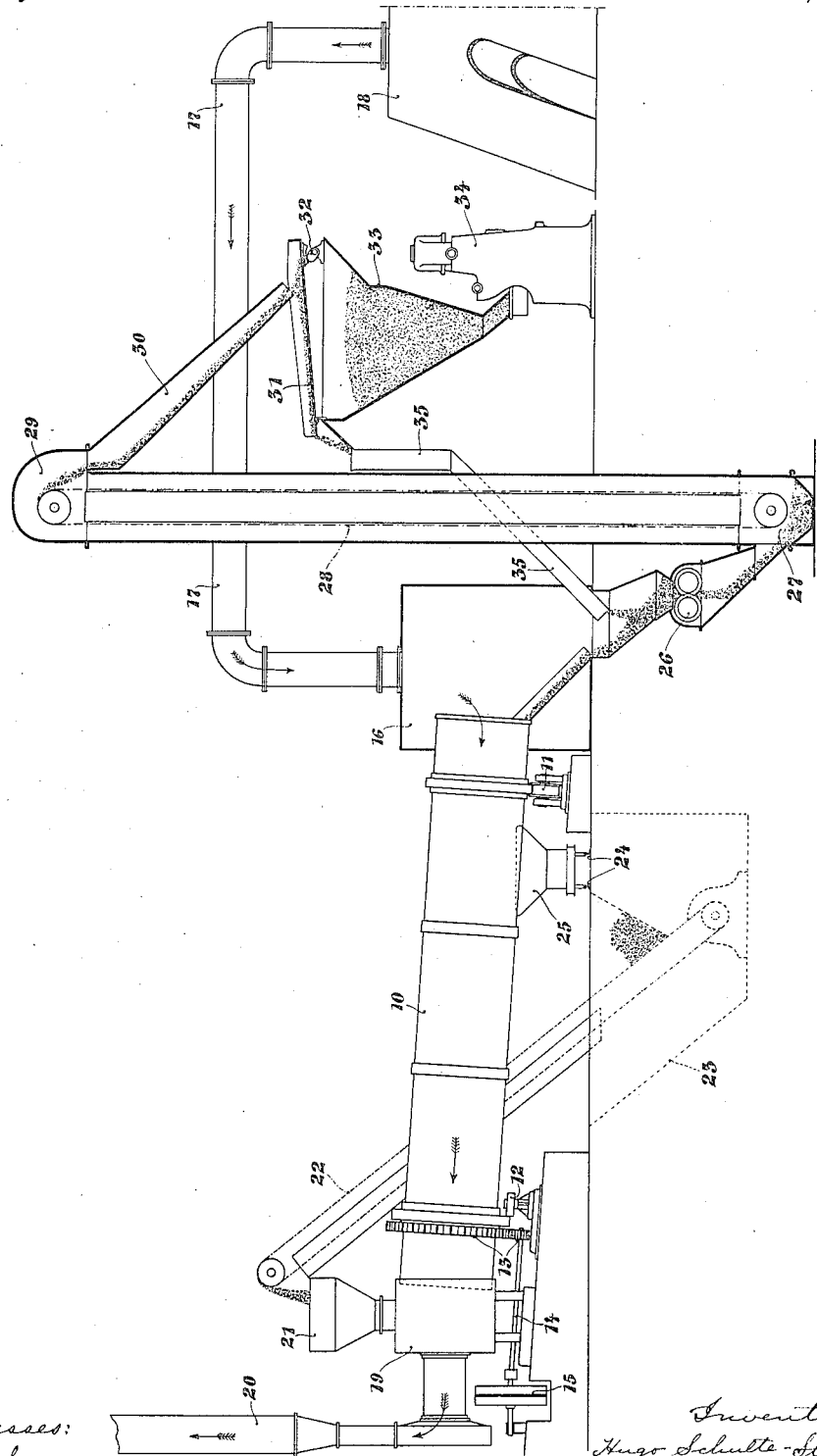

UNITED STATES PATENT OFFICE.

HUGO SCHULTE-STEINBERG, OF DÜREN, NEAR STOCKUM, GERMANY.

PROCESS OF MOLDING BRICKS.

971,693.     Specification of Letters Patent.     Patented Oct. 4, 1910.

Application filed April 6, 1909. Serial No. 488,243.

*To all whom it may concern:*

Be it known that I, HUGO SCHULTE-STEINBERG, a citizen of Germany, residing at Düren, near Stockum, Germany, have invented new and useful Improvements in or Relating to the Process of Molding Bricks, of which the following is a specification.

The methods heretofore known of dry-molding clay-bricks for the purpose of obviating the moistening of the crude clay and consequently the preliminary drying before burning, involve the inherent inconsistency that that minimum of moisture required for securing sufficient ductility and adhesion of the particles of the mass in practice always exceeds the maximum of moisture allowable for the purpose of burning the bricks directly after pressing them.

In the moist clay, used for molding bricks, the water is contained in two forms, which should be held apart in considering the molding process. Firstly, there is the surface water, which envelops the single particles, and secondly, there is the saturation water, which fills the interior of the particles owing to capillary action. This saturation water does not take part in the function of the water as a lubricant or a binding agent, during the molding process, the surface water only being effective. But as during burning of the molded mass, the entire moisture must be driven off, the sum of both waters must again be here considered. In other words, for pressing and for the mechanical cohesion of the molded mass the saturation water is useless, while for burning it is injurious. Now, with the previously practiced dry press processes, the minimal quantity of the surface water used for binding and lubricating, plus the saturation water carried along as ballast, was greater than would permit direct burning. To overcome this objection, the clay was dried more thoroughly than permitted by the minimal quantity of surface water, and was then compressed so strongly that the saturation water would, in part at least, be forced to the surface, to thus assume the function of binding and lubricating agent. But it was just this enormous high pressure which has rendered such processes practically useless.

The present invention primarily consists in a process of dry-pressing clay-bricks, wherein the amount of moisture in the clay is reduced, by heating, to a minimum quantity which remains in the clay in the form of steam, whereupon the clay is molded and then immediately burned. The evaporation may be effected by passing hot gases through the mass, preferably waste-gases from the kiln. In clay saturated with water, the water filling the pores of the mass acts neither as a lubricant nor as a binding agent for holding together the particles until the mass is burned; on the other hand, this water greatly interferes with the drying process in the kiln. According to the present invention so much of this water is removed by evaporation as has the effect of reducing the ductility and adhesiveness of the mass. The residual moisture, in the form of steam, is in part condensed during the molding of the hot mass, and envelops the individual particles, so that the molding can be readily effected. If the molded clay is placed in the kiln while still hot, only a very small residue of moisture remains to be expelled before the burning process can take place. Another advantage of filling the pores of the mass with steam lies in the fact that the air is by this means expelled. It is well-known that the presence of air in the dry-molded mass is liable to result in the formation of cracks and crevices, the air being compressed during the molding operation, and then suddenly expanding with the result referred to. Steam present in the pores is condensed to water during the molding operation and does not reëxpand thereafter, until the moisture is gradually evaporated in the kiln, without deleterious effects. The expulsion of the moisture by evaporation causes the same to be very uniformly distributed in the mass. The molded clay comes exceedingly well through the burning operation, and the finished brick is smooth, even, and of homogeneous structure.

Apparatus for carrying out the improved method of manufacture is shown in the annexed drawing, partly in section.

In the drawing 10 represents an inclined mixing drum rotatable on rollers 11 and 12 and adapted to be driven by means of gear-wheels 13, shaft 14 and pulley 15. At the delivery end of the drum there is a chamber 16 communicating by means of a pipe 17 with the up-take of the kiln 18. At the head of the drum there is a chamber 19 communicating by means of a pipe 20 with a chimney not shown in the drawing. The chamber 19 is provided with a hopper 21, to which clay is delivered by a bucket-conveyer 22 from a pit 23. A rail-track 24 for trolleys 25 leads to this pit. Grinding mechanism 26 is arranged between the chamber 16 and a chamber 27, from which a conveyer 28 leads upward to a delivery chamber 29. A trough 30 leads from the latter to a sieve 31 which is rocked by means of an eccentric 32. Below this sieve there is a hopper 33 which delivers to a molding press 34. The coarse material retained by the sieve returns through a conduit 35 to the chamber 16. Crude clay brought by the trolleys 25 is tipped into the pit 23 and thence conveyed by the conveyer 22 to the hopper 21 and drum 10. In the latter the clay is well mixed and heated by the gases which flow from the kiln 18 through pipe 17 and chamber 16 to the delivery end of the drum. These gases move in the direction opposed to the advance of the clay in the drum, so that the clay becomes well heated and so much of its water is removed by evaporation as has the effect of reducing the ductility and adhesiveness of the mass. The resultant vapor passes with the smoke-gases through chamber 19 and pipe 20 to the chimney hereinbefore referred to. The heated mass is ground by the rollers 26 and conveyed to the trough 30, sieve 31 and hopper 33, the coarser parts being retained by the sieve and returned to the chamber 16 in order to be re-ground. The molding press 34 automatically takes in and molds the ground clay, the residual moisture in the clay, which is retained in the form of steam, being in part condensed during the molding of the hot mass, to envelop the individual particles, so that the molding can be readily effected. The molded bricks can immediately be placed in the kiln 18.

The utilization of waste-heat of the kiln for heating the crude clay is an advantage from the economical point of view, but another source of heat can of course be used for the purpose if desired.

An advantage of introducing the unburned bricks into the kiln in a heated state lies in the fact that no condensation of moisture on the surfaces thereof takes place, as is the case with wet, cold bricks.

What I claim is:—

1. Process of molding heated clay, which consists in bringing heating gases into direct contact with the moist clay, said gases carrying enough heat to turn the water carried by the clay into steam, driving off part of the steam thus formed, molding the hot clay while impregnated with the residual steam, and kiln-drying the molded clay.

2. Process of molding heated clay, which consists in bringing heating gases into direct contact with the moist clay, said gases carrying enough heat to turn the water carried by the clay into steam, driving off part of the steam thus formed, molding the hot clay and simultaneously condensing the residual steam during the molding process, and kiln-drying the molded clay.

3. Process of dry-molding clay for the manufacture of bricks, consisting in heating the crude clay, converting the moisture contained in the clay into steam, by conducting the waste-gases from the kiln through the crumbled and intimately mixed clay, sifting the ground mass and returning to the grinding mechanism the coarse particles retained by the sieve, molding the hot clay, while impregnated with steam and placing the bricks in the kiln.

Signed by me at Barmen, Germany, this 16th day of March 1909.

HUGO SCHULTE-STEINBERG. [L. S.]

Witnesses:
OTTO KÖNIG,
PAUL MÜLLER.